United States Patent
Lucien

[15] 3,677,373
[45] July 18, 1972

[54] DISC BRAKE ASSEMBLY WITH REPLACEABLE FRICTION MEMBERS

[72] Inventor: Rene Lucien, Neuilly-sur-Seine, France
[73] Assignee: Societe Messier, Paris, France
[22] Filed: Aug. 7, 1970
[21] Appl. No.: 61,971

[30] Foreign Application Priority Data
Aug. 7, 1969 France..................................6927223
Sept. 12, 1969 France..................................6931221

[52] U.S. Cl............................................188/73.6, 188/73.5
[51] Int. Cl.................................................F16d 55/228
[58] Field of Search...........................188/73.5, 73.6

[56] References Cited

UNITED STATES PATENTS

| | | | |
|---|---|---|---|
| 3,285,371 | 11/1966 | Cadiou | 188/73.6 |
| 3,331,471 | 7/1967 | Redmayne | 188/73.6 |
| 3,568,807 | 3/1971 | Harrison | 188/73.6 |
| 2,994,410 | 8/1961 | Burnett | 188/73.6 X |

FOREIGN PATENTS OR APPLICATIONS

1,189,333 3/1965 Germany..............................118/73.5

Primary Examiner—George E. A. Halvosa
Attorney—Waters, Roditi, Schwartz & Nissen

[57] ABSTRACT

A pair of friction members are mounted on opposite sides of a brake disc for engagement therewith during a braking operation and the friction members are mounted in a stationary housing for replacement. The friction members are generally quadrangular in shape and have opposite curved side surfaces which are rotatably engaged with corresponding side surfaces of the housing. A releasable holding means acts on the friction members to hold the same in position during braking operations. The holding means may be in the form of springs, plates or rods and when they are released, the friction members can be rotated 90° to be removable through a recess in the housing through which the friction members are otherwise not passable when in their original position.

15 Claims, 20 Drawing Figures

Patented July 18, 1972

Patented July 18, 1972 3,677,373

DISC BRAKE ASSEMBLY WITH REPLACEABLE FRICTION MEMBERS

BRIEF SUMMARY OF THE INVENTION

The invention relates to disc brakes, and, more particularly, to means for maintaining the braking members in proper operative position.

It is known to make friction members of the brake assembly of quadrilateral configuration, wherein two opposite sides are curved sections in the form of concentric circles and abut against the walls of the stationary portion to provide reactions to the forces developed during a braking operation. A convenience afforded by this kind of friction member lies in the ease of its detachment and installation. To remove a friction member, it is turned in its plane 90° and is withdrawn through a radial recess or passage provided in the housing, while re-installation is carried out in reverse.

The invention relates to means for maintaining said friction members in position within the stationary portion of the braking system.

The aforesaid means according to the invention, contact an end surface of the quadrangular friction member which surface may be rectilinear.

According to one of the embodiments of the invention, said means is composed of a flat, leaf spring which has two symmetrical flanges which engage the stationary portion and act on the rectilinear surface of the friction member to maintain the same in position. The ends of the flanges bear against recessed shoulders in the stationary portion on either side of the radial passage.

According to another embodiment of the invention, said means comprises cylindrical projections of two screws tangentially engaging the flat surface of the friction member at opposite ends thereof.

In a further embodiment of the invention, said means comprises a cap engaging a projecting tooth of the friction member; said tooth has two side surfaces extending at an angle to one another, and for example, one is substantially radial and the second is substantially tangential. Engaging one side surface of the tooth, is an abutment of the stationary portion at said recess while the other surface is engaged by the cap which is displaceable to enable release thereof.

DETAILED DESCRIPTION

Figure 1:
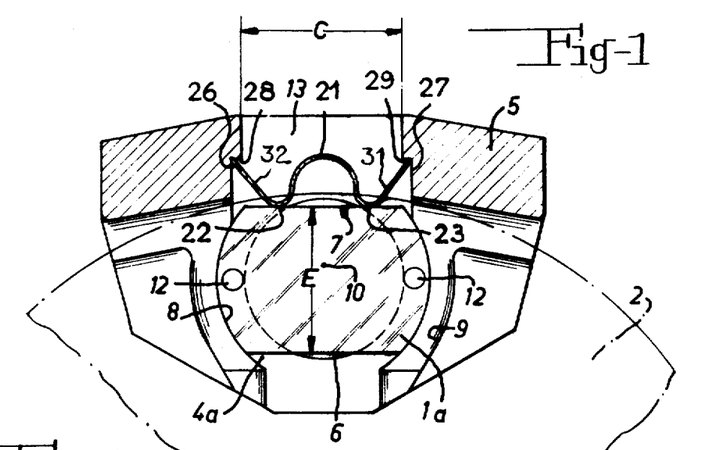
FIG. 1 is an elevational view, partly in section, of a disc brake system according to the invention.
Figures 2, 3:
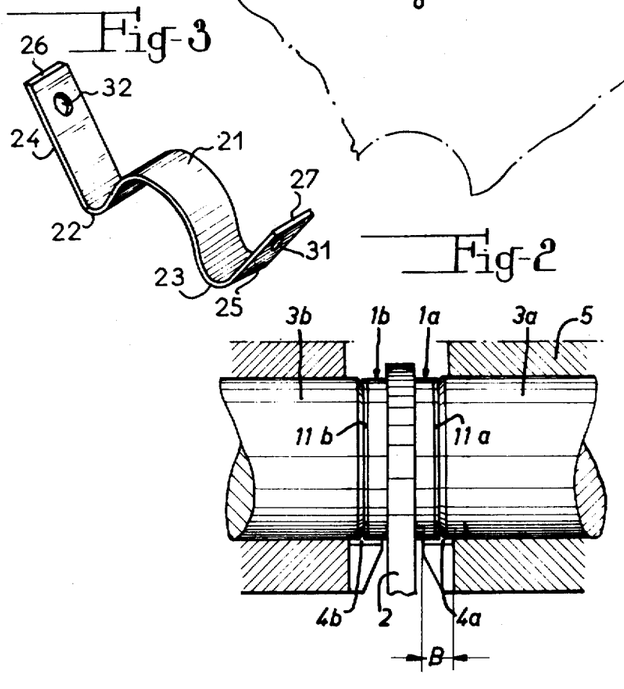
FIG. 2 is an axial section through said system.
FIG. 3 is a perspective view of a flat spring used in the system of FIGS. 1 and 2.

Reference is made to FIGS. 1 and 2 wherein, in a manner known per se, friction members 1a and 1b of the disc brake are positioned on opposite sides of disc 2 to contact the disc under the action of the push rods 3a and 3b which may be operated either by mechanical means or by fluid pressure. These friction members are positioned in respective housings 4a and 4b, provided within a stationary portion 5 of the braking system. In elevation view, each friction member is of part curvilinear and quadrilateral shape and is constituted by two rectilinear sides 6 and 7 with two connecting curved walls 8 and 9 which are part of the circumference of a circle having a center 10. The friction members may optionally be provided with metallic plates 11a and 11b opposite the push rods 3a and 3b. The friction members are provided with two holes 12 of circular form to facilitate their removal, as will be explained more fully later. The housings 4a and 4b correspond in shape to that of the friction members. Each housing is provided with a radial passage 13 larger in extent C than the length of the rectilinear sides 6, 7 for allowing the withdrawal and insertion of the friction members.

In this embodiment of the invention, the friction members are maintained within their associated housing by a flat, leaf spring 21 of W-shape which will be described hereafter with regard to FIG. 3.

The spring 21 contains a bowed central section with two legs 24, 25 joined thereto by two rounded parts 22 and 23 which contact the flat side 7 of the friction member to hold the same in place as seen in FIG. 1. The legs 24, 25 have terminal ends 26, 27 which engage respective shouldered recesses 28, 29 in the stationary portion 5 on either side of radial passage 13.

The direction of legs 24, 25 of the flat spring 21 and their extent are such that any tendency of the friction members to rotate about their respective centers 10 during a braking operation is resisted by the engagement of legs 24 and 25 in recesses 28, 29.

The bowing position of the flat spring ensures the correct maintenance of the friction members in their proper positions during the period of their displacement through the braking and the releasing movements. The flat spring 21 is provided with two holes 31, 32 for application of the spring into position and for its removal as will be explained hereafter.

Figure 4:
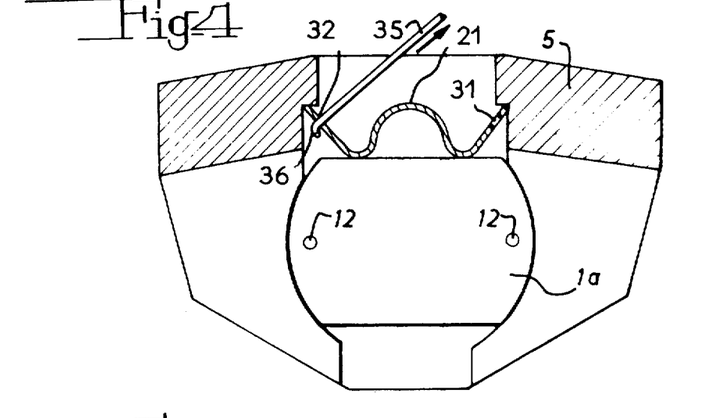
FIGS. 4–6 are elevational views which illustrate successive phases of withdrawal of friction members of the brake system according to FIGS. 1 and 2.
Figure 5:
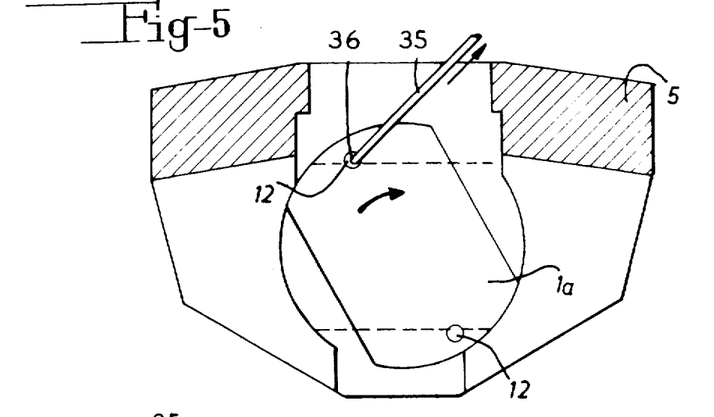
Figure 6:
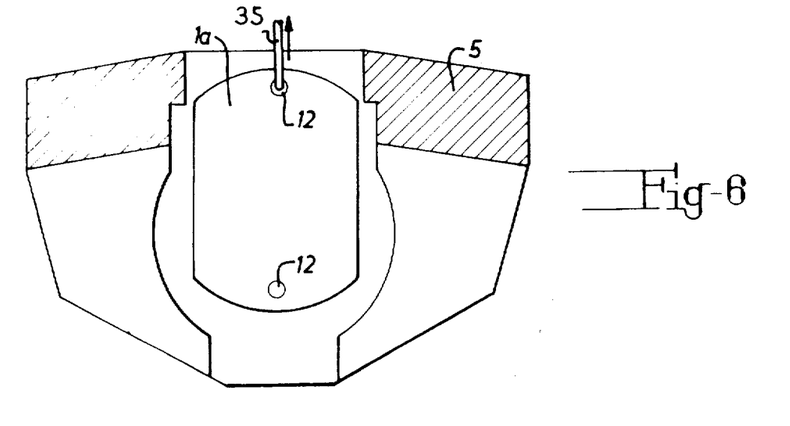

FIGS. 4–6 illustrate the withdrawal of the friction members. First, the flat spring 21 is engaged by a metallic bar 35 having one end bent to form a hook 36. The hook 36 is introduced into the hole 32 of the flat spring as shown in FIG. 4 and the spring is removed. Thereafter, the hook of the same metallic bar is introduced into one of the holes 12 in the friction member and the member is rotated as shown in FIG. 5 until its rectilinear sides are parallel to one of the sides of passage 13 as shown in FIG. 6. In this position the friction member may be removed from the stationary section.

Figure 7:
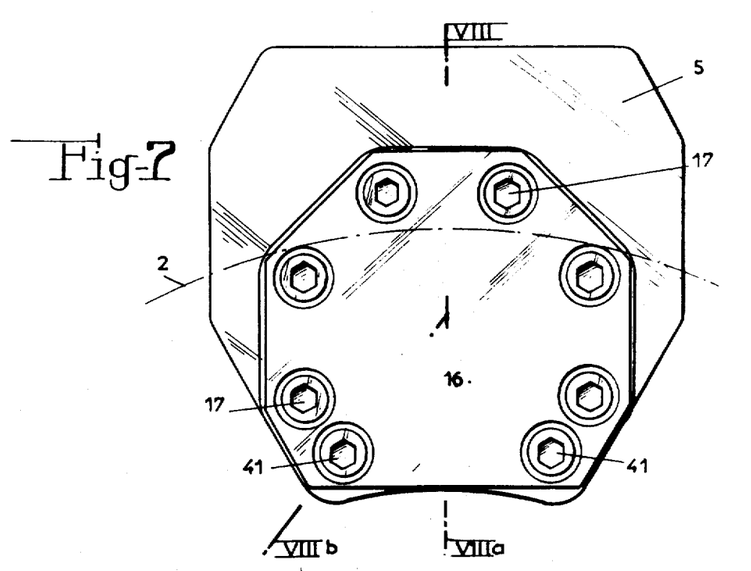
FIG. 7 is an elevational view from the front of another embodiment of the invention.
Figure 8:
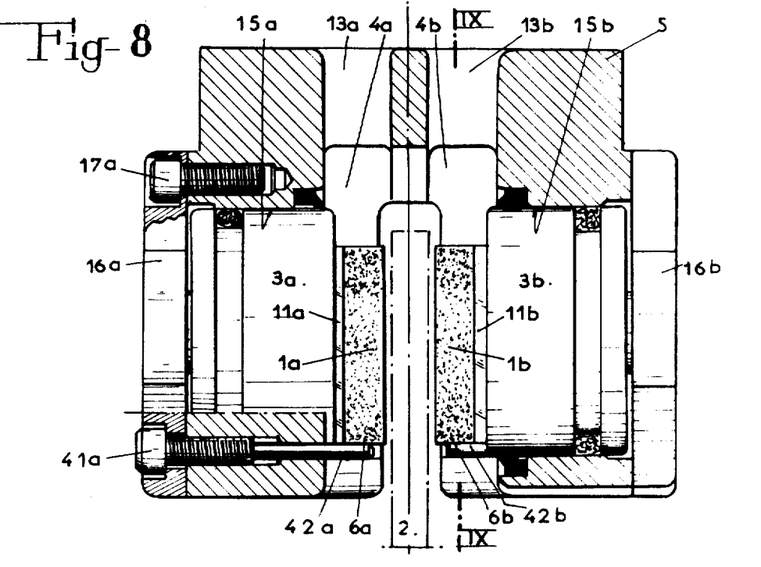
FIG. 8 is a section taken on the right side along the line VIII—VIIIa in FIG. 7 and on the left side along the line VIII—VIIIb in FIG. 7.
Figure 9:
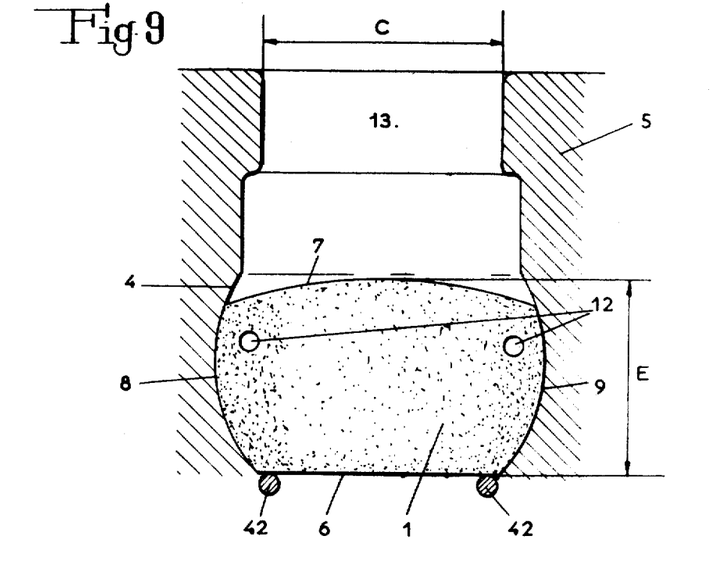
FIG. 9 is a portion of the section taken along line IX—IX in FIG. 8.
Figure 10:
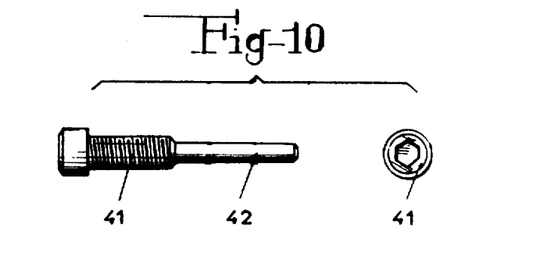
FIG. 10 is a detail of an assembling screw with a cylindrical projection, as shown in FIGS. 7–9.
Figure 11:
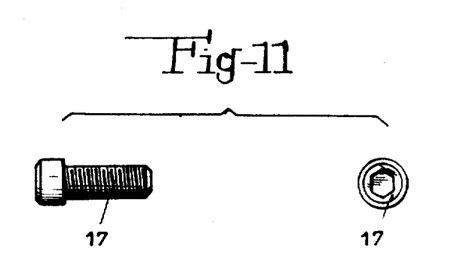
FIG. 11 is a detail of another assembling screw in FIGS. 7–9.

Another embodiment of the invention will now be described with reference to FIGS. 7–9 which shows a disc brake actuated by hydraulical means. The same reference numerals will be used for structure which is the same as that described in the previous embodiment.

Two push rods 3a and 3b are supported in bores 15a and 15b of the stationary portion 5 of the braking system. The bores are closed at their ends opposite the disc 2 by plates 16a and 16b affixed to the stationary portion 5 by means of screws 17 and pairs of screws 41 provided with cylindrical projections 42. The length of the projections 42 is such that the end portions thereof tangentially contact the flat side 6 of the friction members. Two screws 41 are engaged with the same friction member and are spaced from each other to engage the side 6 at the remote ends thereof. Under these circumstances, any tendency of rotation of the friction member in either direction within its housing is resisted by the cylindrical projections 42.

During the removal and installation of the friction members in the brake system, all the operations are identical to those which have been already described in connection with the first embodiment, except for the fact that it is necessary at the beginning of the removal operation to back off the screws 41 a distance sufficient for allowing the friction members to rotate within their housing, whereas upon re-installation, it is necessary to advance the screws to the position in which projections 42 engage the friction members 1a and 1b.

The embodiment described hereinabove is operative in connection with hydraulic operation. The operation in connection with mechanical control operating, for instance, the push bars 3 and the covers 16 is obvious to those skilled in the art and will therefore not be described in any detail.

A further embodiment of the invention is next described with reference to FIGS. 12-20.

Figure 12:
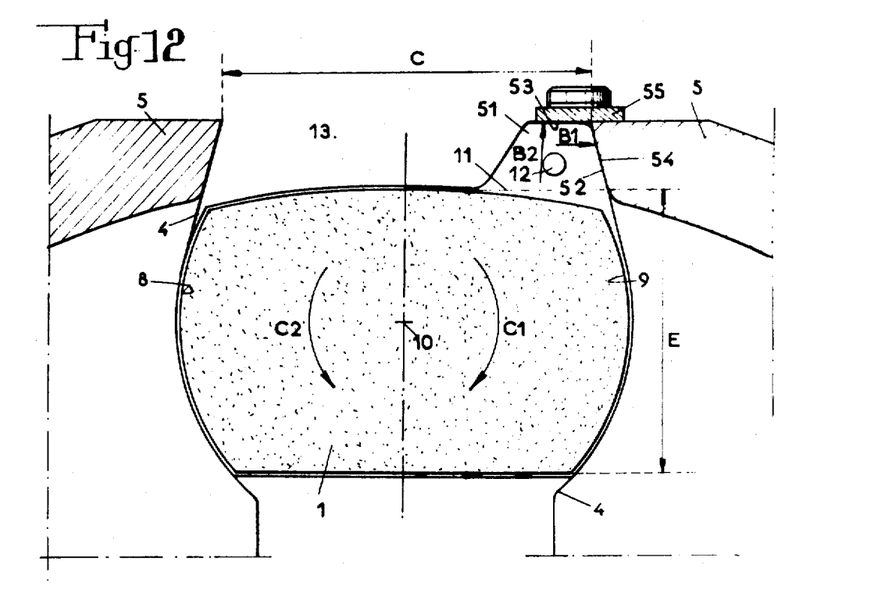
FIG. 12 is an elevational view, partly in section, of another embodiment of the invention.
Figure 13:
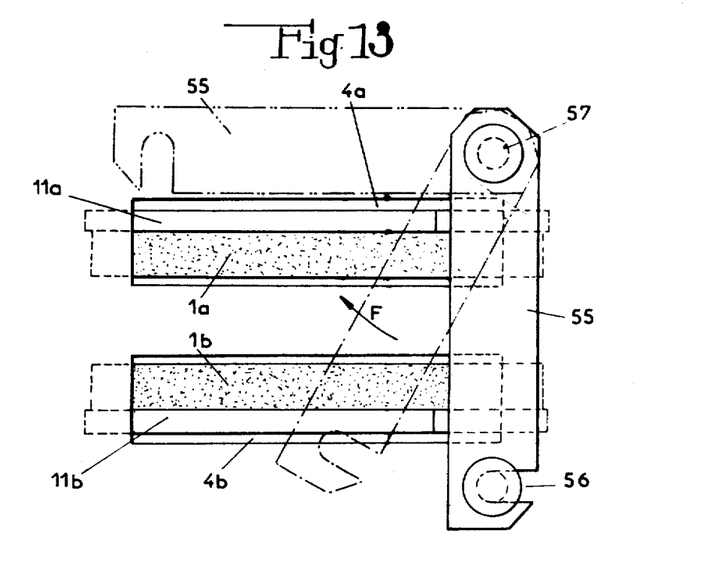
FIG. 13 is a plan view thereof.

Reference is first made to FIGS. 12 and 13 wherein the same reference numerals are employed for the same components previously described. The friction members 1a and 1b have a quadrangular shape defined by two curved sides 8 and 9 of circle form having a center 10. The friction members are placed in circular housings 4a and 4b which are open in radial passages 13. The extent C of a passage 13 is larger than the height E of a friction member. The housings 4a and 4b are provided within the stationary portion 5 of the braking system. The upper surface 11 of the friction member 1 is curved and is provided adjacent one of its ends with a tooth 51 having one side wall 52 which is substantially radial and a second side wall 53 which is generally tangential. The side wall 52 contacts a face 54 within the stationary portion 5 of the braking system. Engaging side wall 53 is a cap 55 having an open slot 56 and an opening 57 by means of which said cap is detachably mounted on stationary portion 5. The withdrawal hole 12 in the friction member is located in tooth 41.

During the braking operation, the resulting tangential force developed by the contact between the friction members 1a, and 1b and the braking disc 2 induces a pivoting moment $C_1$ and $C_2$ in the friction members dependent on the position of the force with regard to the center 10. The tooth 51 can contact the stationary portion 5 and the cap 55 so that two reaction forces $B_1$ and $B_2$ are produced which oppose moments $C_1$ and $C_2$, respectively. The presence of the tooth 51 and the cap 55 ensures in a particularly simple manner the maintenance of the proper position of the friction member during the brake operation.

If the friction members are to be removed or re-installed, the cap 55 is disengaged from portion 5 at opening 57 and is pivoted about opening 57 through an angle of 90° or more in the direction as indicated in dotted lines and by arrow F in FIG. 13. This pivotal movement frees the passage 13 for entry or removal of the friction members 1a and 1b into or from housings 4a and 4b in the stationary portion 5. The passage 13 allows withdrawal of the friction members as explained in the procedure described hereinbefore. Namely, the friction member is rotated by 90° by introduction of hook 36 of bar 35 into hole 12 and the friction member is passed through passage 13.

Figure 14:
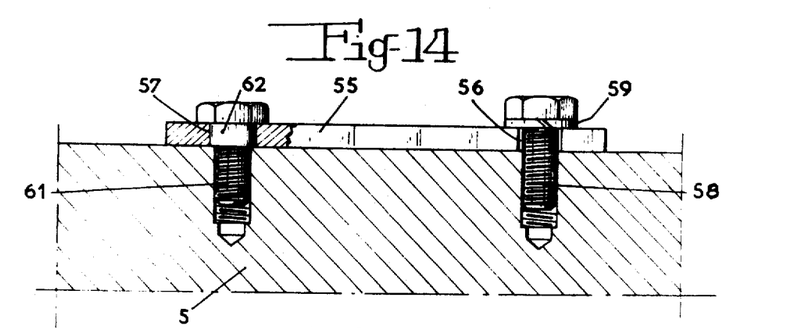
FIG. 14 is a sectional view of a detail of the embodiment of FIG. 12.

The detachable mounting of cap 55 on stationary portion 5 may be effected in a very simple manner as shown in FIG. 14. Therein is seen a screw 58 having a washer 59 covering the open slot 56, while at the other end a screw 61 is installed having a head portion 62 for engaging opening 57. The screw 61 may be substituted by a conventional screw provided with a thick ring or with a collar flange or even with a broad rim.

Figure 15:
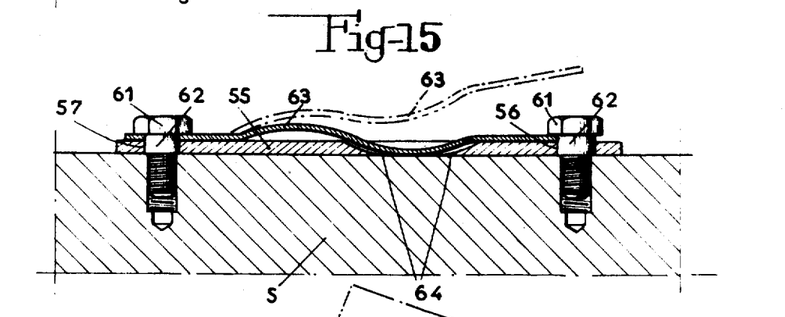
FIGS. 15 and 16 illustrate modified versions of the detail of FIG. 14.

FIG. 15 illustrates another configuration of the cap according to this invention. Herein, cap 55 is affixed to stationary portion 5 by means of two screws 61 and is secured in its proper position by a bowed spring 63 cooperating with a longitudinal groove 64 provided within cap 55. One of the ends of the bowed spring 63 has an articulation opening engaged by the head of one of the screws 61, while the other end of bowed spring 63 possesses a hook placed beneath the head of the other screw 61. The fixation of cap 55 is effected by engagement of the arc of bowed spring 63 in the groove 64.

Figure 16:
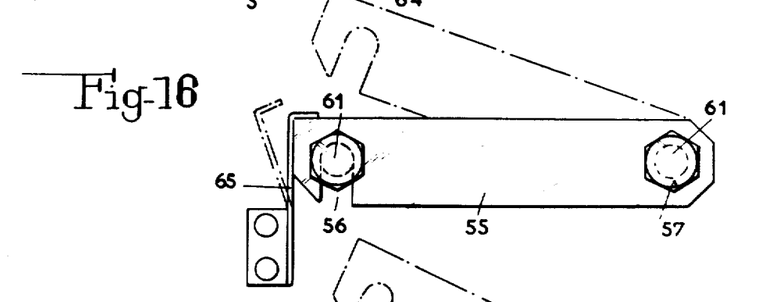

FIG. 16 shows a similar mounting effected by means of a spring 65 engaged over stationary portion 5 and elastically compressing the side area of the slotted end 56 of cap 55.

Figure 17:
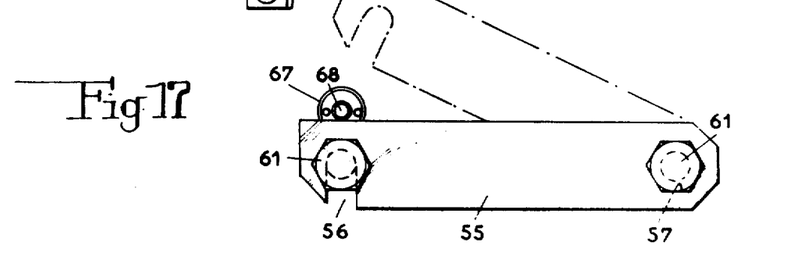
FIG. 17 shows another modification.
Figure 18:
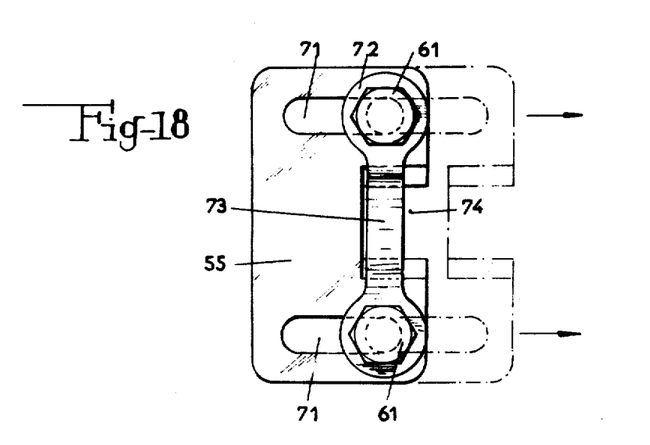
FIG. 18 shows yet another modification.

FIG. 17 illustrates a similar kind of mounting effected by means of a spring clamp 67 fixed to the stationary portion 5 and having a head 68 engaged with the side of cap 55. It is necessary for a pressure to be exerted against said head 68 to disengage cap 55 from its fixed position.

The various modifications of securing of cap 55 are related to a separable cap by rotatable screw means. However, the cap may be constructed to be disengageable and engageable in any other manner, as for example, by displacement thereof. In this regard, reference is made to FIG. 18 in which cap 55 is mounted for a shifting fixation on the stationary portion 5. There are provided two screws 61 with heads (or screws having a fixed top nut or another ring or rim, as already explained). The screws are engaged in respective slot openings 71 of a substantial length provided in cap 55. The fixation of the cap 55 in its service position is ensured by means of a bowed spring 72 held by the screws 61, the spring 72 having an arc portion 73 which cooperates with an abutment 74 provided within cap 55. Fixation is attained by engagement between the edges of arc 73 and abutment 74 and this engagement is very effective.

Figure 19:
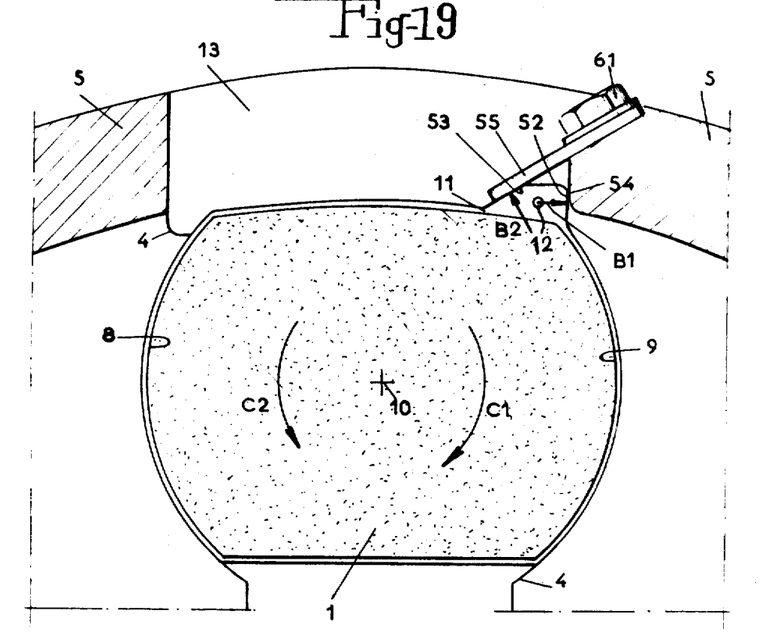
FIG. 19 is analogous to FIG. 12 and illustrates a modified form of cap mounted to be shiftable as that shown in FIG. 18.

The position of the cap 55 is not limited to that shown in FIG. 12. With reference to FIG. 19 the cap 55 may be mounted obliquely in the passage 13. Use is made in this arrangement of the shifting fixation shown in FIG. 18.

Figure 20:
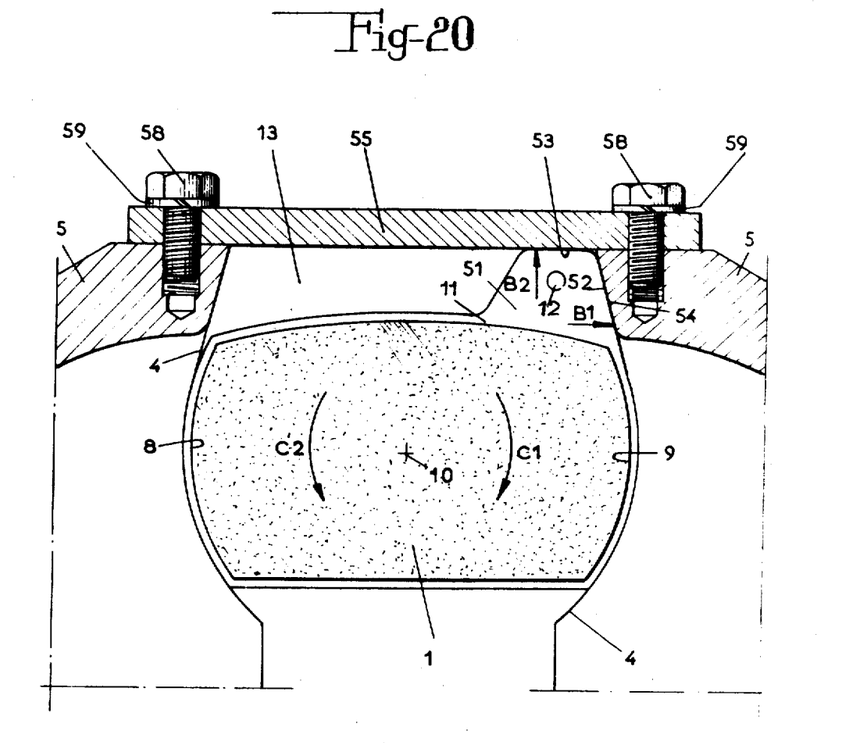
FIG. 20 is also analogous to FIG. 12 and shows a cap closing the recess of the stationary portion.

The shape of cap 55 may be modified and in this respect, reference is made to FIG. 20. It may be desirable or even necessary to close the stationary portion 5, for instance, to prevent any noxious and harmful penetration of foreign particles into the interior of the braking assembly. In this case, cap 55 is formed as a plate covering the passage 13 and affixed by means of four screws 58 with washers 59.

The invention is not limited to the embodiments which have been described herein and it may include modifications which are evident to those skilled in the art. For instance, the curvilinear walls of the braking members which have been illustrated as having an arc configuration corresponding to a circle may be effected along concentric circles having different radii. Also the simple mounting hole 12 engageable by the hook 26 of bar 25 may be replaced by an opening or a slot which allows it to be engaged by hook 26 or by another tool.

What is claimed is:

1. A disc brake assembly comprising a brake disc, a pair of friction members on opposite sides of the brake disc adapted for contacting the brake disc during a braking operation, a housing including a stationary portion removably supporting the friction members, support means mounted on the stationary portion for detachably holding the friction members in the stationary portion, said stationary portion having a recess through which said friction members are removable and insertable when the support means is released from the friction members, said friction members being elongated and having a greater width as compared to their height, said friction members having opposite side surfaces which are curved and rotatably engageable with corresponding curved surfaces of said stationary portion, said curved, side surfaces of the friction members being two segments of a single circle, said recess having an extent greater than the height of the friction members but less than the width thereof, said friction members being blocked against removal from the stationary portion when held by the support means in the stationary member and being rotatable through an angle of 90°, when released by the support means, to permit removal through said recess, a projecting tooth on each said friction member having a first surface in abutment with said stationary portion and a second surface extending at an angle to said first surface, said support means comprising a displaceable cap fixably mountable on said stationary portion and engageable with said second surfaces of the teeth of both friction members to secure the friction members in the stationary portion, said cap being a flat, rigid member with a planar surface in face to face contact with said second surface of the teeth when the friction member is secured in the stationary portion, said cap having opposite ends, and means supporting said cap for displacement along said stationary member such that the cap can slide along said second surface of the teeth to a position out of contact with said teeth, the latter means comprising first and second fasteners attached to said stationary portion and engaging the cap at its respective ends to secure the cap to the stationary portion.

2. A disc brake as claimed in claim 1 wherein said first and second surfaces on said projecting tooth intersect one another, so that the tooth is held by the cap and stationary portion along mutually intersecting surfaces.

3. A disc brake as claimed in claim 1 wherein one of said fastners supports said cap for pivotal movement to a position out of contact with said teeth.

4. A disc brake as claimed in claim 1 wherein said fastners support said cap for linear displacement to a position out of contact with said teeth.

5. A disc brake as claimed in claim 1 wherein said fastners are screw means.

6. A disc brake as claimed in claim 1 comprising spring means secured to the stationary portion and engageable with the cap to hold the same in position.

7. A disc brake as claimed in claim 1 wherein said cap closes said recess when engaged with said teeth.

8. A disc brake as claimed in claim 1 wherein said cap extends at an oblique angle with respect to said recess when engaging said second surface.

9. A disc brake as claimed in claim 1 wherein said first and second surfaces are substantially perpendicular to one another.

10. A disc brake as claimed in claim 1 wherein said tooth has a hole enabling engagement by a tool to rotate the friction member.

11. A disc brake as claimed in claim 1 wherein said cap is detachable from one of the fasteners, and is pivotable about the other fastener.

12. A disc brake as claimed in claim 11 wherein said cap has a slot at said one end for separation from said one fastener when the latter is loosened.

13. A disc brake as claimed in claim 1 comprising a bowed spring engaging the cap to hold the same in position.

14. A disc brake as claimed in claim 13 wherein said cap has a groove in which the bowed spring is engageable.

15. A disc brake as claimed in claim 14 wherein said cap has opposite elongated slots, said disengageable fasteners engaging the bowed spring at the ends thereof, said fasteners being slidable in said slots and fixable to said stationary portion, the bowed spring being engageable with said cap at said groove by lateral abutment thereat.

* * * * *